US008144719B2

(12) United States Patent
Yadlon et al.

(10) Patent No.: US 8,144,719 B2
(45) Date of Patent: Mar. 27, 2012

(54) METHODS AND SYSTEM TO MANAGE DATA TRAFFIC

(75) Inventors: Catherine A. Yadlon, Townsend, MA (US); Michael A. Kahn, Hudson, MA (US); Francis J. Stifter, Jr., Hampton Falls, NH (US)

(73) Assignee: Broadbus Technologies, Inc., Boxborough, MA (US)

( * ) Notice: Subject to any disclaimer, the term of this patent is extended or adjusted under 35 U.S.C. 154(b) by 880 days.

(21) Appl. No.: 11/258,309

(22) Filed: Oct. 25, 2005

(65) Prior Publication Data

US 2007/0116025 A1    May 24, 2007

(51) Int. Cl.
*H04L 12/28* (2006.01)
*H04L 12/54* (2006.01)
*G01R 31/08* (2006.01)

(52) U.S. Cl. ........ 370/412; 370/230; 370/235; 370/419; 370/428

(58) Field of Classification Search .......... 370/229–240, 370/411–419
See application file for complete search history.

(56) References Cited

U.S. PATENT DOCUMENTS

| 5,499,238 | A | * | 3/1996 | Shon | 370/399 |
| 5,550,823 | A | * | 8/1996 | Irie et al. | 370/413 |
| 5,689,713 | A | * | 11/1997 | Normoyle et al. | 710/263 |
| 6,072,772 | A | * | 6/2000 | Charny et al. | 370/229 |
| 6,122,251 | A | * | 9/2000 | Shinohara | 370/231 |
| 7,023,840 | B2 | * | 4/2006 | Golla et al. | 370/360 |
| 7,068,672 | B1 | * | 6/2006 | Jones | 370/412 |
| 2002/0191626 | A1 | * | 12/2002 | Moriwaki et al. | 370/413 |
| 2003/0021230 | A1 | | 1/2003 | Kuo et al. | 370/203 |
| 2003/0031193 | A1 | * | 2/2003 | Andrews et al. | 370/412 |
| 2003/0048792 | A1 | * | 3/2003 | Xu et al. | 370/400 |
| 2004/0008487 | A1 | * | 1/2004 | Hisano et al. | 361/690 |
| 2004/0081184 | A1 | * | 4/2004 | Magill et al. | 370/413 |
| 2004/0083326 | A1 | | 4/2004 | Wang et al. | 710/317 |
| 2005/0053077 | A1 | * | 3/2005 | Blanc et al. | 370/395.72 |
| 2005/0201400 | A1 | * | 9/2005 | Park et al. | 370/412 |

FOREIGN PATENT DOCUMENTS

DE    W00038376 A1    6/2000

OTHER PUBLICATIONS

European Patent Office, European Search Report, May 3, 2007, pp. 2.
EPC Search Opinion, RE: Application #06022353.4; May 31, 2007.

* cited by examiner

*Primary Examiner* — Kevin C Harper
*Assistant Examiner* — Thinh Tran
(74) *Attorney, Agent, or Firm* — Stewart M. Wiener

(57) ABSTRACT

A system includes multiple input ports that forward received data (e.g., data packets) to each of multiple queues. Data received at the input ports of the system can be somewhat random or "bursty" at times. That is, the input ports can receive data at a variable bit rate or unspecified bit rate from an internal system source or an external source such as an FTP (File Transfer Protocol) server or SCSI disk array. The queues output data at a constant bit rate. A two-dimensional scheduler associated with the system forces random inbound server traffic from the input ports to adhere to a QoS (Quality of Service) agreement such that the random nature of the inbound traffic does not negatively affect the deterministic guarantees of existing server traffic output from the queues. In other words, techniques herein ensure adherence to QoS requirements among the data flows, without overflowing the queues.

31 Claims, 7 Drawing Sheets

METHODS AND SYSTEM TO MANAGE DATA TRAFFIC

RELATED APPLICATION

This application is related to co-pending U.S. patent application entitled "METHODS AND SYSTEM TO OFFLOAD DATA PROCESSING TASKS," Ser. No. 11/258,524, filed on an even date herewith, the entire teachings of which are incorporated herein by this reference.

BACKGROUND

A so-called queue is a device or data structure in which stored elements are removed in the same order they were received.

One type of queue is referred to as FIFO (First In First Out). In general, a FIFO outputs oldest received data before outputting more recently received data. Thus, if a FIFO stores a string of sequentially received data packets A, B, and C, (where A is the first received data packet, B is the second received data packet, and C is the last received data packet), the FIFO first outputs data packet A, then outputs data packet B, and finally outputs data packet C.

Another type of queue is referred to as a LIFO (Last In First Out). In contrast to a FIFO, a LIFO is a data structure in which elements are output in a reverse order from which they were entered. In other words, the last data stored in a respective LIFO is the first data to be output from the LIFO. A LIFO is sometimes referred to as a stack.

As discussed, one purpose of a queue is to temporarily store data for use at a later time. If data is input to the queue at a faster rate than data being outputted from the queue, eventually the queue will overflow and data will be dropped. Certain conventional systems are designed to handle the occurrence of dropped data packets by notifying respective senders to resend any data packets that are detected as being dropped. Other conventional systems prevent overflowing the queues by notifying a sender to at least temporarily stop sending data when the queue is in danger of being overfilled with data.

SUMMARY

There are deficiencies associated with conventional techniques of managing data traffic forwarded to multiple queues. For example, as discussed, conventional flow control techniques prevent queues from overflowing with data in response to reacting to congestion. In other words, a conventional system notifies a sender to at least temporarily stop or slow a rate of sending data to prevent a set of queues from overflowing with data. Unfortunately, this can restrict the sender from sending bursts of data when it is needed. Also, such conventional techniques react to congestion rather than avoid an occurrence of the congestion in the first place. Thus, conventional systems attempt to solve a congestion problem after it occurs rather than prevent it. Moreover, certain conventional flow control techniques typically involve transmitting in-band flow control messages. Transmission of in-band flow control messages can have the affect of increasing overall congestion.

As mentioned, other conventional techniques involve increasing a size of respective queues in order to handle large bursts of data. Unfortunately, use of larger queues increases an overall cost of a system in at least two ways. First, larger queues cost more than smaller queues. Second, the use of larger queues requires that a respective circuit board on which the queues are mounted be larger in size to accommodate the larger queues. Furthermore, use of larger circuit boards increases an overall size of a respective system housing, and so on.

The following disclosure includes several useful embodiments for more efficiently forwarding received data to a set of multiple output queues (e.g., FIFOs). For example, according to one embodiment, a system herein includes multiple input ports that forward received data (e.g., data packets) to each of multiple queues. A rate of receiving data received at the input ports of the system can be somewhat random or "bursty" at times. That is, the input ports can receive data at a variable bit rate, constant bit rate, or unspecified bit rate from an internal system source or an external source such as an FTP (File Transfer Protocol) server or SCSI disk array. The queues output data at a constant bit rate or a deterministic rate. Thus, there exists a need in certain embodiments herein to regulate data flow from the input ports to the queues so that the queues do not overflow with data.

To achieve this end, a two-dimensional scheduler according to an embodiment herein forces random inbound server traffic to adhere to a quality of service (QoS) agreement such that the random nature of the inbound traffic does not negatively affect the deterministic guarantees of the existing server traffic outputted from the queues. In other words, techniques herein ensure adherence to QoS requirements among input port data flows, while preventing an occurrence of overflowing the queues with data (e.g., dropping of data packets). The scheduler (or scheduling techniques) herein can be implemented as a distributed function or centrally located in a dedicated resource. The scheduler also can be work conserving or non-work conserving depending on the embodiment.

A first level scheduler (e.g., a master scheduler overseeing each of input ports) of the two-dimensional scheduler maintains queue status information (e.g., accumulators) that tracks an ability for each of multiple queues to accept data. For example, the first level scheduler tracks a respective fullness of the queues and their ability to accept new data.

During a permission granting cycle, when the first level scheduler grants permission to the input ports to forward data to one or more of the queues, the first level scheduler receives an indication whether each of multiple input ports has data to forward to at least one of the multiple queues. The first level scheduler then initiates execution of an algorithm to select, from the multiple input ports, a set of input ports that will be granted permission to forward data to a given queue of the multiple queues. The number of input ports granted permission to forward data to the queues can vary depending on how much new data a respective queue is able to store without overflowing. Thus, based on the queue status information and "emptiness" of respective queues, the first level scheduler grants a set of one or more one input ports permission to forward data to the given queue after identifying that the given queue can accept data.

According to one embodiment, the first level scheduler grants permission to the input ports to send traffic to the queues such that each of the input ports, over time (e.g., over successive permission granting cycles), can forward data at a respective minimum bandwidth rate to each of the queues. In other words, the first level scheduler ensures that a respective input port is granted permission to send data to each of the queues such that none of the input ports is "starved" from transmitting data to any of the respective queues over successive permission granting cycles. Note that an input port need not be programmed to forward data to each of the queues at the same minimum rate. Instead, the input port can be programmed to forward data to each of the queues at a different respective minimal rate.

Each of the input ports has an associated second level scheduler for further regulating (e.g., scheduling) to which of the multiple queues an input port is allowed to send data for each successive permission granting cycle. For example, as discussed above, a respective second level scheduler of the two-dimensional scheduler described herein receives permission from the first level scheduler to forward data to certain queues. Recall that in a given permission granting cycle, the first level scheduler can grant permission for a respective input port to forward data to more than one queue. However, note that in one embodiment, the respective second level scheduler (e.g., input port) must choose one of the queues (for which permission was granted to forward data) in which to forward a respective data packet. A respective link between the input port and the queues can support only a limited bandwidth. In such an embodiment, only a single data packet can be forwarded from a given input port to a respective queue during a respective permission granting cycle.

Each of the input ports stores data to be forwarded to each of the different queues. Accordingly, based on respective tag information such as destination addresses associated with the data, each of the respective input ports can determine to which of the queues a received data packet is targeted for transmission. However, as mentioned, each of the second level schedulers can only send one data packet to a given queue for a respective permission granting cycle. Consequently, when the first level scheduler grants the second level scheduler permission to forward data packets to more than one queue, each of the second level schedulers must decide which of the more than one permitted queue to send a respective data packet.

To ensure fairness at the first level, the first level scheduler ensures that each of the ports are given their fair share of permission over successive permission granting cycles to forward data packets to the queues. For example, the first level scheduler (e.g., a master ingress scheduler) determines, on a queue basis, which of the input ports will be allowed to send traffic to the queues. This first level scheduler ensures that the queues do not overflow as a result of granting permission to too many input ports at the same time.

To ensure fairness of scheduling at the second level (e.g., port level), the second level scheduler (e.g., slave ingress scheduler) ensures that each of the ports are given their fair share of permission over successive permission granting cycles to forward data packets to the queues. For example, the second level schedules receives the slot grant information from the master scheduler (note: multiple slots can be granted by the master scheduler during a same grant cycle) and determines, on a port basis, which of the queues the local input port will be allowed to forward data traffic. The second level scheduler ensures that a per queue minimum bandwidth and port minimum bandwidth are not violated for a respective input port.

Thus, according to one embodiment, techniques herein include scheduling transmission of data from multiple input ports to multiple queues so as to (1) conserve server resources, (2) meet minimum port/slot bandwidths assigned to the inbound flows to the input ports, and/or (3) not exceed a maximum slot bandwidth assigned to the inbound flows.

Techniques herein are well suited for use in applications such as management of bursty data traffic through each of multiple queues as discussed herein. For example, techniques herein ensure throughput of data according to a quality of service agreements (QoS agreements). In one embodiment, techniques herein include generating deterministic output data flows from an unspecified bit rate input data, variable bit rate input data, or constant bit rate input data. However, it should be noted that configurations herein are not limited to use in such applications and thus configurations herein and deviations thereof are well suited for other applications as well.

Other examples of the present disclosure, in addition to potentially being implemented via discrete hardware components such as logic, buffers, registers, etc., include a hardware platform such as a computerized device (e.g., a computer processor system, a host computer, personal computer, workstation, etc.) that is configured to support the aforementioned techniques of regulating a flow (e.g., scheduling a transmission) of data packets form a set of input ports to a respective group of output queues. In such embodiments, the computerized device includes a memory system, a processor (e.g., a processing device), and a respective interconnect. The interconnect couples the processor to the memory system. The memory system is encoded with an application (e.g., software code) that, when executed on the processor, produces a process of regulating data traffic forwarded from the input ports to the output queues.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate data flow management as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or an Field Programmable Gate Array (FPGA) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to perform the steps of: i) maintaining queue status information that tracks an ability for each of multiple queues to accept data; ii) receiving an indication whether each of multiple input ports has data to forward to at least one of the multiple queues; iii) initiating execution of an algorithm to select, from the multiple input ports, a set of input ports to forward data to a given queue of the multiple queues; and iv) granting the set of at least one input port permission to forward data to the given queue after identifying, based on the queue status information, that the given queue can accept data. Other embodiments of the present application include software programs to perform any of the method embodiment steps and operations summarized above and disclosed in detail below.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

According to one embodiment, a system includes multiple input ports that forward received data (e.g., data packets) to each of multiple queues. Data received at the input ports of the system can be somewhat random or "bursty" at times. That is, the input ports can receive data at a variable bit rate or unspecified bit rate from an internal system source or an external source such as an FTP (File Transfer Protocol) server or SCSI disk array. The queues output data at a constant bit rate. A scheduler such as a two-dimensional scheduler associated with the system forces random inbound server traffic from the input ports to adhere to a QoS (Quality of Service) agreement such that the random nature of the inbound traffic received at the input ports does not negatively affect the deterministic guarantees of existing server traffic output from the queues. In other words, according to one embodiment, techniques herein ensure adherence to QoS requirements among "burtsy" input data flows, without overflowing respective queues that empty at a constant or deterministic rate.

Figure 1:
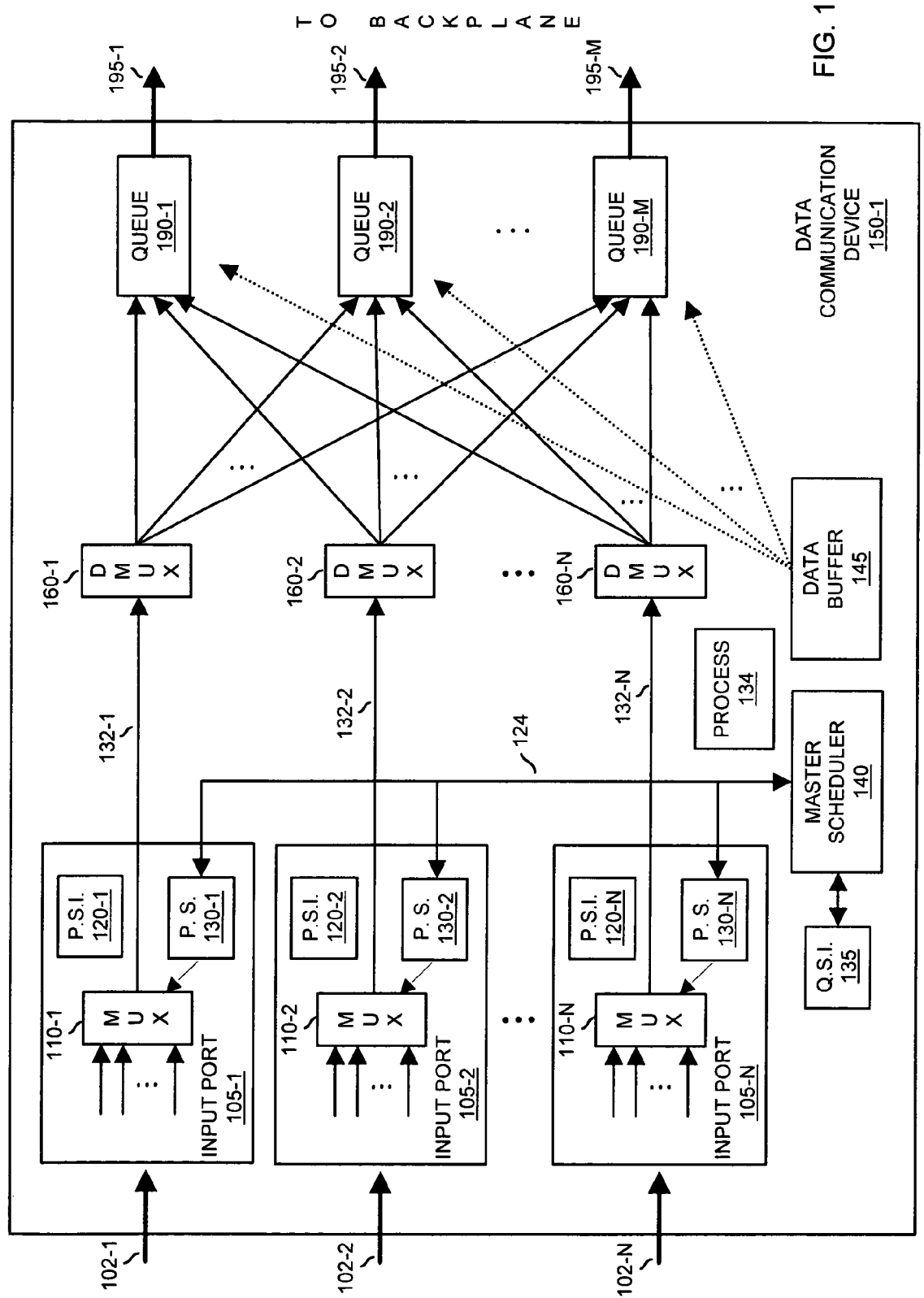
FIG. 1 is a block diagram of a data communication device according to an embodiment herein.

FIG. 1 is a block diagram of a data communication device 150-1 according to an embodiment herein. As shown, data communication device 150-1 includes input port 105-1, input port 105-2, . . . , input port 105-N (collectively, input ports 105), demultiplexer 160-1, demultiplexer 160-2, . . . , demultiplexer 160-N (collectively, demultiplexers 160), queue 190-1, queue 190-2, . . . , queue 190-M (collectively, queues 190), queue status information 135, master scheduler 140, process 134, and data buffer 145. Each of the respective input ports includes a corresponding multiplexer 110, port status information 120, and port scheduler 130. For example, input port 105-1 includes multiplexer 110-1, port status information 120-1, and port scheduler 130-1. Input port 105-2 includes multiplexer 110-2, port status information 120-2, and port scheduler 130-2, and so on. Links 132 (e.g., link 132-1, link 132-2, . . . , link 132-N) provide a path for forwarding data from input ports 105 to queues 190 through respective demultiplexers 160.

Data communication device 150-1 includes input channels 102 (e.g., input channel 102-1, input channel 102-2, etc.) for receiving data. Data communication device 150-1 includes output channels 195 (e.g., output channel 195-1, output channel 195-2, etc.) for outputting data from queues 190.

Data received on input channels 102 and output on respective output channels 195 can be any type of data content and/or files of data such as MPEG data, audio, visual, audio-visual, etc. In one embodiment, the data communication device receives and forwards data packets on the order of kilobits in length.

According to one embodiment, the input data/content traffic on input channels 102 is unspecified and, at times, can be bursty in nature. The rate of outputting data traffic on output channels 195 can be fixed as a result of the queues 190 emptying at a constant bit rate. The bursty nature of input data on input channels 102 can occur in response to customer requests for data (e.g., data streams), server configuration, network configuration, server load, and network load.

As its name suggests, the master scheduler 140 schedules forwarding of data from input channels 102 to output channels 195. The master scheduler 140 works in combination with the port schedulers 130 to schedule a throughput of data packets from input channels 102 to output channels 195. However, note that according to one embodiment, not all data received on input channels 102 is directed through queues 190 to output channels 195. For example, some data received on input channels 102 can be stored in data buffer 145 or other repository (e.g., memory, disk, etc.) local to data communication device 150-1.

In one embodiment, the master scheduler 140 and respective queue status information 135 reside on a same circuit board as one of the input ports 105. Circuit boards associated with the other (N−1) input ports 105 are slaves.

Note that data buffer 145 can also fill queues 190 with data for outputting to output channels 195. Consequently, the bandwidth for transmitting data from output channels 195 is allocated for outputting data received on input channels 102 as well as outputting data from data buffer 145.

According to a general operation of data communication device 150-1, each of the input ports 105 receives data packets from a respective input channel 102 (e.g., a fiber channel, twisted pair, coaxial cable, etc.). Each of the data packets can include an address indicating a destination that is used for forwarding purposes. For example, a respective address of a data packet can be used to indicate which of multiple queues 190 to forward a respective data packet. In one embodiment, each of the queues 190 forwards data packets to a respective destination such as another data communication device in a mesh of interconnected data communication devices as will be discussed later in this specification.

In one embodiment, each of the input ports 105 includes a respective set of buffers (e.g., a FIFO, queue, memory, register, etc.) or slots for at least temporarily storing received data packets prior to transmission over a respective link 132. That is, a respective input port 105 includes a respective set of slots for storing data packets destined for each of the queues 190. If data communication device 150-1 included 10 queues (e.g., M=10), then each of the input ports 105 would maintain a set of ten different slots or buffers. Each of the slots is used to store data packets having the same destination address for forwarding to a respective one of the queues 190.

Port schedulers 130 control multiplexers 110 for purposes of forwarding data packets over links 132, through demultiplexers 160, to queues 190. For example, port scheduler 130-1 controls which of the data packets to transmit over link 132-1. In one embodiment, link 132-1 serially conveys data packets to demultiplexer 160-1 over time. Based on a destination address associated with a transmitted data packet, the demultiplexer 160-1 forwards the data packet to the appropriate queue 190.

A combination of master scheduler 140 and the port schedulers 130 manage scheduling of data packets received on input channels 102 through queues 190 to output channels 195. For example, master scheduler 140 maintains queue status information 135 to keep track of a relative fullness of the queues 190 over time and their respective abilities to accept new data.

In one embodiment, data communication device 150-1 utilizes accumulators to keep track of queue status information 135 such as whether a respective queue 190 can accept new data. The accumulators automatically increment (or decrement, as the case may be) over time to reflect data being streamed out of the queues 190. Each of the accumulators decrements a stored value when an input port 105 that it tracks happens to forward a data packet to a respective queue 190. By incrementing and decrementing the accumulators accordingly, the value in a respective accumulator reflects an amount of frees space in a respective queue 190 and the master scheduler 140 can identify a "fullness" (or "emptiness") of a respective queue at any given time based on a value of a respective accumulator used to track the respective queue 190.

Master scheduler 140 receives feedback from the input ports 105 indicating when a respective queue 190 has been filled with data forwarded from a particular input port 105. The feedback from multiple input ports 105 indicating that the one or more of the input ports forwards a respective data packet to a given queue serves as a trigger for decrementing values of respective accumulators that keep track of the fullness of each of the queues 190 at any given time.

In one embodiment, the master scheduler 140 periodically (e.g., in a permission granting cycle) checks the status of the queues 190 and grants permission to the port schedulers 130 to forward data packets from the respective input port 105 to one or more of the queues 190.

In certain cases, the master scheduler 140 can receive an indication that multiple input ports 105 transmitted data packets to the same queue 190 for a given permission granting cycle. In such a case, master scheduler 140 would decrement the accumulator associated with the queue by an amount corresponding to the overall number of newly forwarded data packets. At the same time, the master scheduler 140 knows how much data was outputted from the queues 190 since a last permission granting cycle and thus increments the queue status information 135 a respective amount over time to reflect newly available space in the queues 190.

Process 134 can apportion how much available bandwidth will be allocated for forwarding data from the respective input ports 105 to the queues 190 as well as how much bandwidth (e.g., bandwidth for forwarding data information associated with tens or hundreds of movies) will be allocated for forwarding data in data buffer 145 to queues 190. Since a combination of the queues 190 output data at a fixed rate, the queues 190 could overflow with data without regulating or scheduling a flow of data from each type of source (e.g., input ports 105 versus data buffer 145) filling the queues 190 with data.

One purpose of master scheduler 140 is to grant permission to transmit data packets to each of the input ports 105 to guarantee at least a minimum rate of transmitting data packets from each of the input ports 105 to each of the queues 190. Master scheduler 140 receives port status information 120 from the input ports 105 indicating which of input ports 105 need to be granted permission to forward data packets to respective queues 190.

Input ports 105 that need to transmit a data packet (because they fail to send data at a respective minimum rate) to a given queue 190 are known to be "starved" from sending data to the given queue. Based on the port status information, in a given permission granting cycle, the master scheduler 140 identifies which of the input ports 105 are starved and need to be granted permission to forward data to a respective queue so that the input ports 105 transmit to each of the queues 190 according to at least a respective minimum rate. Note that the minimum rates for sending data from a respective input port 105 to each of the queues 190 can be set to different values.

Via messaging over bus 124, the master scheduler 140 grants the appropriate permission to the port scheduler 130 to forward data to the queues 190. Note that the master scheduler 140 can grant permission for a respective input port 105 to transmit a data packet to none, one, or more than one queue 190 for a given permission granting cycle. Recall that a decision to permit forwarding data packets depends on whether a respective queue can be filled without overflowing the queue 190 with data.

The port schedulers 130 locally determines which of the queues 190 to forward a data packet after being granted permission to do so from the master scheduler 140. For example, if the master scheduler 140 grants permission to port scheduler 130-1 to transmit a data packet from input port 105-1 to queue 190-1 and queue 190-2, the port scheduler 130-1 locally decides which of the two queues to send a data packet for a given permission granting cycle. The port scheduler 130-1 will have to wait until a following grant cycle for the master scheduler 140 to grant permission again to forward data to the queue 190 not chosen in the previous permission granting cycle.

After a forwarding decision has been made at the input port level, the port scheduler 130-1 provides feedback to the master scheduler 140 indicating to which of the queues 190 the input port 105-1 sent a respective data packet. Master scheduler 140 then updates the queue status information 135 to reflect that the chosen queue has been filled with new data. In other words, master scheduler 140 decrements the respective accumulator associated with the chosen queue to account for newly added data packet.

Note that for a given permission granting cycle, the master scheduler 140 can receive feedback from multiple port schedulers 130 that they each initiated forwarding of a respective data packet to a particular queue 190-1. In this case, the master scheduler 140 updates the respective accumulator accordingly to reflect that the queue 190-1 was filled with multiple data packets.

For a given permission granting cycle, the master scheduler 140 may not receive an indication that any of the input ports 105 have been "starved" of forwarding data to the queues 190. Recall that a "starved" condition occurs when there is a high likelihood that a respective input port 105 will not meet at least a minimum rate of forwarding data to a respective one of the queues 190. Based on the port status information 120-1, if none of the input ports are "starved" of sending data, the master scheduler 140 will grant all input ports to that respective queue 190, if the respective queues 190 can accommodate packets transmitted from all input ports 105. For example, in a given permission granting cycle, in which there are no starved slots for any of the input ports 105, if the master scheduler 140 identifies that queue 190-2 can accommodate data from all 10 input ports for a given permission granting cycle, it will grant all 10 input ports. If only 5 of 10 input ports 105 has data to send to queue 190-2, a maximum of 5 data packets will be sent to that queue 190-2. On the other hand, if the master scheduler 140 identifies that queue 190-2 can not accommodate data from all 10 input ports, even though only 5 of 10 input ports 105 wish to forward a respective data packet to queue 190-2, the master scheduler 140 will not grant permission to any of the input ports 105 to forward a respective data packet to queue 190-2. Instead, the master scheduler 140 will wait until a following permission granting cycle, when enough of the data has been emptied from queue 190-2 to accommodate 10 data packets, to grant permission to all 10 input ports to forward respective data packets to the queue 190-2. Thus, one embodiment herein includes identifying a group of input ports, if granted permission to simultaneously forward the respective data packets to the given queue, would overflow the given queue with data. The master scheduler 140 declines a grant of permission for the group of input ports to forward the respective data packets to the given queue for at least one successive permission granting cycles until the given queue outputs enough stored data such that there is enough room in the given queue to store the respective data packets from each member of the group of input ports without overflowing the given queue.

In certain cases, there may be multiple starved slots and the master scheduler 140 learns from the queue status information 135 that a respective queue 190 can only hold a single data packet. As in the non-starved scenario, as described above, the master scheduler 140 will not grant permission to any of the input ports 105 to forward a respective data packet to queue 190-2. Instead, the master scheduler 140 will wait until a following permission granting cycle, when enough of the data has been emptied from queue 190-2 to accommodate all input ports, to grant permission to the starved input ports to forward respective data packets to the queue 190-2.

Figure 2:
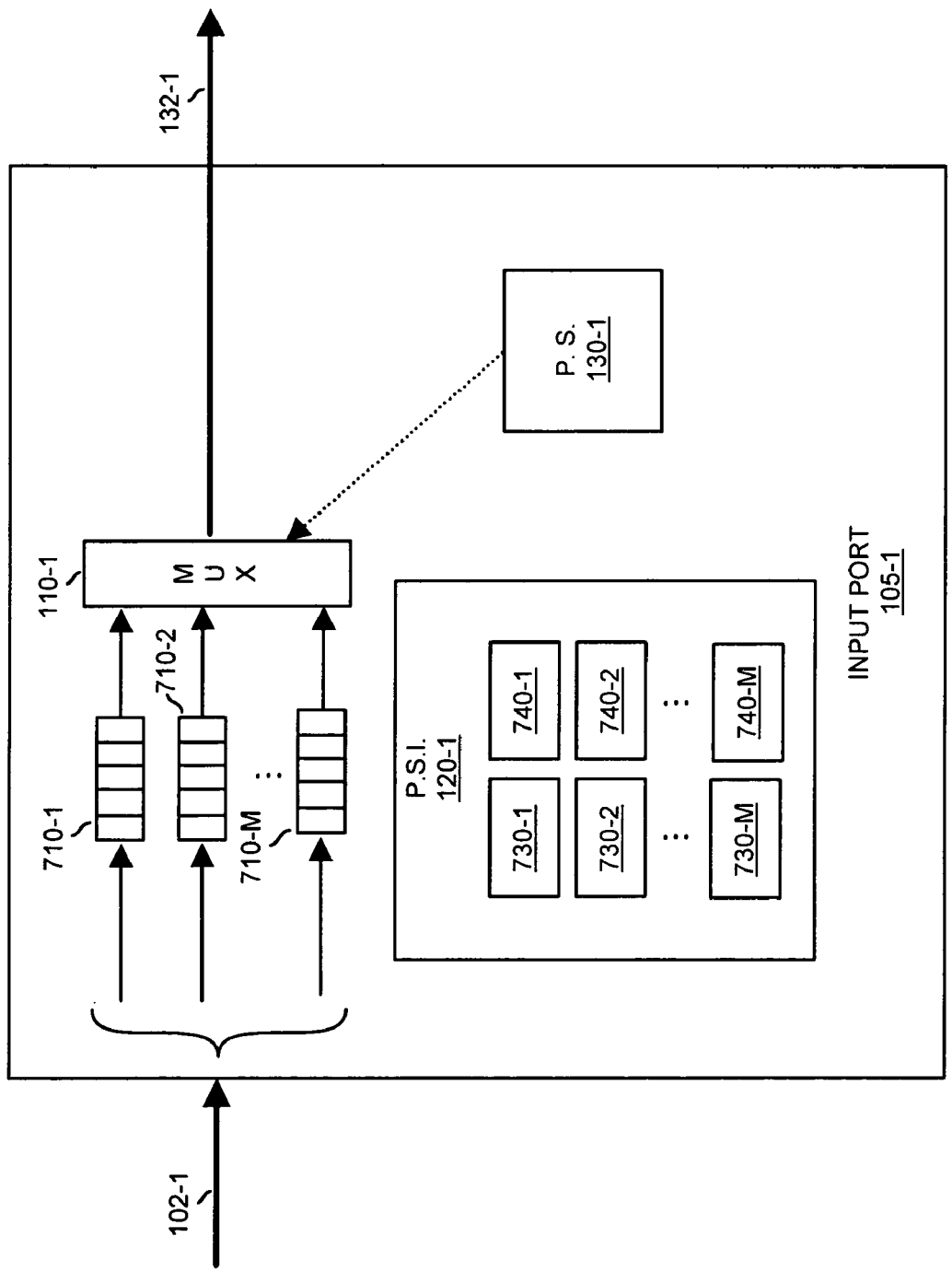
FIG. 2 is a detailed block diagram of an input port including multiple accumulators for measuring data throughput associated with multiple slots according to an embodiment herein.

FIG. 2 is a detailed block diagram of an input port 105 according to an embodiment herein. As shown, input port 105-1 includes respective slots 710 for storing or queuing data packets for transmission over link 132-1 to one of queues 190. For example, slot 710-1 stores data packets to be forwarded to respective queue 190-1, slot 710-2 stores data packets to be forwarded to respective queue 190-2, . . . , slot 710-M stores data packets to be forwarded to respective queue 190-M. Each of the slots 710 has an associated set of accumulators for tracking which of the slots 710 is able to forward respective data packets to a corresponding queue 190 over time. For example, port status information 120-1 includes corresponding accumulator 730-1 and accumulator 740-1 for keeping track of data forwarded from slot 710-1 to queue 190-1. Port status information 120-1 includes corresponding accumulator 730-2 and accumulator 740-2 for keeping track of data forwarded from slot 710-2 to queue 190-2, and so on. As will be further discussed, each respective accumulator 730 ensures that a respective port scheduler 130-1 forwards data from each of the slots to a corresponding one of the queues 190 at a minimum acceptable bandwidth. Each respective accumulator 740 ensures that the respective port scheduler 130-1 schedules forwarding of data packets so that each slot forwards a respective fair share of data packets over link 132-1 to a respective one of queues 190.

Note that the master scheduler 140 can grant a given one of the input ports 105 permission to forward data to multiple queues 190 during a particular permission granting cycle. The respective port scheduler 130 associated with the input port then decides, for the permission granting cycle, which one of the queues 190 to send a respective data packet. Based on the queue 190 that has been selected for packet transmission, the port scheduler 130 updates the respective accumulator 730 and 740 and notifies the master scheduler 140 of which queue was filled with the forwarded data.

In one embodiment, the accumulators 730 and 740 increment and decrement in a similar way as discussed above for the accumulators associated with master scheduler 140. For example, a software process programs the accumulators to a minimum preset rate. Each of the accumulators 730 and 740 increments and decrements based on this preset rate when a data packet is respectively transmitted and not transmitted from a slot 710 to a corresponding queue for a given permission granting cycle. For example, when the input port 105-1 forwards a data packet from slot 710-1 to corresponding queue 190-1, the input port 105-1 decrements the respective accumulators 730-1 and 740-1 by the preset amount for that slot. If the accumulators associated with a respective slot reach a detectable fixed threshold value, the port or link 132 is considered starved and the respective slot gets the highest scheduling priority to forward a data packet on future permission granting cycles. For example, when a respective accumulator 730 increments and reaches a threshold value as a result of a respective slot 710 not being able to forward data packets to a respective queue 190, the input port 105-1 notifies the master scheduler 140 of this "starved" condition. When a respective accumulator 740 increments to a threshold value as a result of a respective slot 710 not being able to forward data packets to a respective queue 190, the port scheduler 130-1 gives the slot higher or highest priority of forwarding data packets to a respective queue on a next permission granting cycle when the master scheduler 140 grants appropriate permission. Use of accumulators 730 and 740 will be described in more detail later in this specification.

As will be further discussed later in this specification, via use of accumulators 740, if multiple slots are "starved" and have data to send to a respective queue 190, the port scheduler 130-1 schedules forwarding of data packets from each of the sots 710 in a round robin fashion to ensure that each slot has is granted a fair share of bandwidth to forward data to a respective one of queues 190. This occurs over multiple permission granting cycles, during which the master scheduler 140 grants permission to the respective input port 105-1 to send a single data packet to one of the queues 190 for each cycle. If no slots 710 are starved over one or more successive permission granting cycles, the port scheduler 130-1 grants slots 710 permission to forward data in a round robin fashion over link 132 to queues 190 for those slots 710 that have data packets to send to a respective queue 190. Consequently, a respective port scheduler 130 of an input port 105 can ensure fairness of forwarding data even when none of the slots are starved of sending data.

Figure 3:
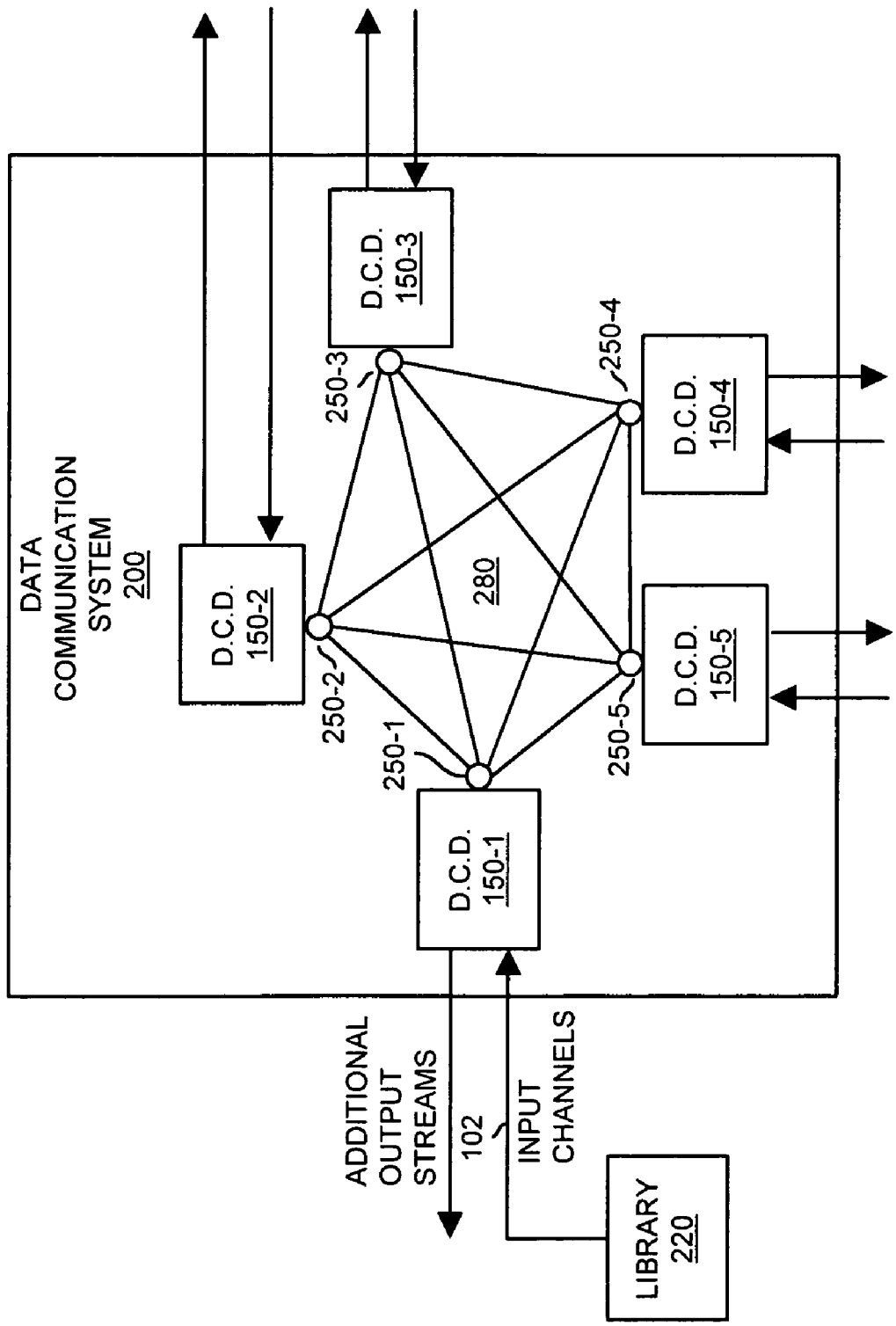
FIG. 3 is a block diagram of multiple data communication systems interconnected via a mesh according to an embodiment herein.

The previous discussion of FIGS. 1 and 2 provide specific details of a the two-dimensional scheduler (with respect to a single data communication device 150-1) that forces random inbound server traffic to adhere to a QoS agreement such that the random nature of the inbound traffic does not negatively affect the deterministic guarantees of the existing server traffic output of the queues. FIG. 3 further describes the random nature of the inbound traffic to each of multiple data communication devices as well as data communication system in which to apply the above techniques. For example, the data communication device 150-1 discussed above can be replicated into multiple circuit boards that are connected to a common backplane or communication mesh. In such an embodiment, as will be further discussed in FIG. 3, each output queue 190 of a respective data communication device 150 forwards data to a corresponding one of the other data communication devices 150.

FIG. 3 is a diagram of multiple data communication devices 150 interconnected via a communication mesh 280 forming data communication system 200 according to an embodiment herein. In the context as shown, data communication device 150-1 receives data on input channels 102 from library 220 and outputs data to each of the other data communication devices 150 over communication mesh 280. Each of the data communication devices 150 can be a circuit board that connects to a communication mesh 280 such as a backplane. The backplane can include a bus or links for forwarding data from each of the respective queues 190 to the other data communication devices 150 (e.g., other circuit boards) in data communication system 200.

In a similar way as described for data communication device 150-1, each of the data communication devices 150 in data communication system 200 can receive data from an external source and, via use multiple queues, deterministically forward data to each of the other data communication devices 150. In one embodiment such as the one shown in FIG. 3, each of the data communication devices 150 includes a corresponding communication interface 250 (e.g., data communication device 150-1 includes communication interface 250-1, data communication device 150-2 includes communication interface 250-2, and so on) connecting it to each of the other data communication devices 150 in data communication system 200. In one embodiment, the communication interface 250 is a mechanism such as a switch, data bus, etc. Accordingly, a data communication device 150 can receive and forward data packets received from a source such as library 220 and forward them to one or more of the other data communication device 150 that store the information in a respective repository.

In addition to the functionality discussed above, each of the data communication devices 150 can stream (e.g., via output streams) data stored in a respective local repository to different destinations external to data communication system 200. In one embodiment, data communication system 200 streams video data from each of the respective data communication devices 150 to many external destinations. One such application is streaming of on-demand movies to customers at respective residential locations.

As mentioned, according to one embodiment, the input data/content traffic on input channels 102 is unspecified and, at times, can be bursty in nature. The data traffic on respective output channels of data communication device 150-1 to other data communication devices is a constant bit rate. The bursty nature of input data on respective input channels 102 can occur in response to customer requests for data (e.g., data streams), server configuration, network configuration, server load, and network load. Data communication system 200 is scalable to the extent that additional data communication device 150 can be added to communication mesh 280. Adding a data communication device (e.g., a blade or circuit board that connects to a respective backplane) adds further system traffic, magnifying a need for scheduling requirements as discussed above with respect to FIG. 1.

Referring now to a combination of FIGS. 1-3, a problem (e.g., overflow) can occur when the request rate of data forwarded from multiple input ports 105 (e.g., eight input ports 105) to respective queues 190 is greater than the maximum throughput of the backplane link for the queues 190. For example, in one embodiment, each of the queues 190 is able to output data to a respective backplane link such as up to 7.52 gigabits per second. As mentioned, a certain portion of bandwidth for outputting data (e.g., to a backplane link) from the queues 190 can be allocated for use by a local process 134 of data communication device 150-1 to output data from data buffer 145 through queues 190 to a respective backplane link. In addition to this bottleneck of outputting data from each of the queues 190 at a maximum of 7.52 gigabits per second, as mentioned, each input port 105 is limited to forwarding data to the queues 190 according to a respective bandwidth supported by links 132 between the respective input ports 105 and the queues 190. In one embodiment, the maximum throughput rate of a respective link 132 is 1.52 gigabits per second. A maximum request rate from an input port 105 for forwarding data to each backplane link (e.g., a respective queue 190) is 1 request every 5.39 microseconds.

If each of the input ports 105 were to forward data to a given queue 190 at a rate of 1.52 gigabits per second, this would amount to the given queue 190 being filled with data at a rate of 12.16 gigabits per second. Since the maximum backplane throughput per link is 7.52 gigabits per second, the given queue 190 would overflow with data. In one embodiment, the master scheduler 140 as well as respective port schedulers 130-1 work together to ensure that each of the queues 190 never overflows.

Another problem can occur when an instantaneous burst rate for forwarding data from a combination of multiple input ports 105 to a given queue 190 is greater than a respective maximum transfer rate of outputting data from the given queue 190. For example, if an input port's maximum sustainable rate is 700 megabits per second, there is enough bandwidth for each of eight input ports 105 to transmit to the same queue (e.g., backplane link) if the data transfers occur at a constant bit rate. This problem occurs when instantaneous bursts of the combined ports is greater than 7.52 gigabits per second. The maximum burst that can be created is 1.52 gigabits per second for each of links 132. A protocol for transferring data on the links enables transfers of 2 Megabyte blocks of data. When an entire block is forwarded to a given queue 190, 1 Kbyte blocks are output from the queue 190 (e.g., forwarded to the backplane) every 5.39 microseconds. The entire 2 Megabyte block outputs from the queue in 11 milliseconds. A lengthy burst at 1.52 gigabits per second from an input port 105 will overflow the respective queue 190 if all of the input ports 105 are given permission to simultaneously transmit to the same queue 190.

Recall that a certain portion of output bandwidth associated with queues 190 can be allocated for outputting data from data buffer 145. Thus, the maximum rate of forwarding data from a combination of all input ports 105 to a given queue 190 can be less than 7.52 gigabits per second. For example, if data buffer 145 is allocated to fill a given queue 190 at a rate of 3.52 gigabits per second, then the combination of input ports 105 are limited to filling a given queue 190 at a rate of 4 gigabits per second (e.g., 7.52−3.52=4). In other words, the input ports 105 can be granted permission to forward data packets to the given queue as long as the schedulers do not permit forwarding of data packets from a combination of input ports 105 at a rate greater than 4 gigabits per second.

The amount of bandwidth allocated for filling the queues 190 can change over time depending upon how much data must be streamed from the data buffer 145 through the queues 190 to the other data communication devices 150 in data communication system 200. Thus, the schedulers herein can be notified whether a given queue 190 can handle a higher or lower rate of input over time.

One purpose of the scheduling algorithm implemented by the data communication device 150-1 (e.g., the master scheduler 140 and respective port schedulers 130) is to schedule the traffic from the input ports 105 to multiple queues 190. For example, in one embodiment, the queues 190 output data through a backplane to other data communication devices 150. The traffic to the backplane flows out of the queues 190 at a constant bit rate and the traffic into the input ports 105 is variable and bursty in nature.

Due to a minimal amount of buffering (e.g., minimally sized queues 190), the schedulers needs to make a decision upon every permission granting cycle whether to allow forwarding of data packets from respective slots to ensure that the queues 190 do not overflow. In addition to preventing too much data from being forwarded from input ports 105 to a respective queue 190, the scheduler herein (e.g., a combination of the master scheduler 140 network device port scheduler 130) supports minimum port bandwidth, a minimum bandwidth of an input port to forward data to each of the queues 190, and does not exceed the maximum queue bandwidth. In other words, the schedulers ensure: i) that each input port 105 can forward data at a minimum respective rate to a given queue, ii) that each input port 105 forwards data through a respective link 132 at a minimum rate, and iii) that a combination of the input ports 105 do not forward data to each of the queues 190 above a respective predetermined rate.

As mentioned, the basic idea of scheduling according to an embodiment herein is to break up the scheduling algorithm into two parts. First, the master scheduler 140 determines which of the queues 190 an input port 105 will be granted permission to forward data. The respective port scheduler 130 (e.g., slave) determines, based on permission granted from the master scheduler 140, which of the one or more queues 190 to forward data to the queues 190. Based on the permission grants, the slave schedulers (e.g., port schedulers 130) determine which queue 190 in a given permission granting cycle to forward respective data. The master scheduler 140 ensures that the slot minimums for each port are met and that the maximum aggregate bandwidth for filling a respective queue is not exceeded.

The messaging bus 124 between the master scheduler 140 and the input ports 105 enables the master scheduler 140 to learn of port status information 120-1. The port status information 120 for an input port 105 includes information such as whether a respective input port 105 has been "starved" of forwarding data to a particular queue 190. The port status information 120 indicates whether a "minimum slot bandwidth" is in jeopardy of being violated and whether the respective input port has data to forward to the queues 190, etc. The port schedulers 130 ensure that the port minimums for each slot are met. In other words, a respective port scheduler 130 associated with a corresponding input port 105 enables forwarding of data packets to the different queues 190 at respective minimum rates.

Slot/Port Schedulers Implementation Example

Below are further details of the two-dimensional scheduler according to one embodiment herein. Accumulators provide input to the scheduler 130 to determine if the minimum and maximum slot/port bandwidths have been met. Various algorithms can be used to provide this same information to the scheduler.

Minimum Slot Accumulators and Minimum Port Accumulators:

In one embodiment, there are M "minimum slot accumulators" (e.g., accumulators 730) and M "minimum port accumulators" (e.g., accumulators 740) associated with each slot 710 of an input port 105. Thus, for a given input port 105, there are two accumulators for each slot 710.

For example, port 2, slot 1 has an associated minimum port accumulator and a minimum slot accumulator as does port, slot #2, port2, slot #3, and so on. These 20 accumulators associated with the input port 105-1 are used to ensure the minimum slot bandwidth and the minimum port bandwidth. For these accumulators, software initiates incrementing a respective accumulator by a step value based on the minimum desired bandwidth for the slot as follows: A respective accumulator is initially set to a predefined value such as (0x0F000). After every 5.39 microseconds such as a packet transmission time, the accumulator increments by a programmed step value. If and when the accumulator reaches a predefined threshold such as (0x10000), the slot (or port) associated with the accumulator will be considered starved and will be given highest priority on a permission granting cycle to forward data to the queues 190. Note that permission can be granted to the input ports 105 to forward data to the queues 190 even if they are not starved at a slot or port level.

Upon forwarding of a respective data packet from an input port 105 to a queue, a respective accumulator decrements by one packet time (Acc—0x1000). Software has the ability to set the upper and lower bound of this accumulator. This directly affects the amount of history the accumulator keeps. For example, if a slot is starved for a while, the accumulator will count up to a maximum of 0x1F000 or 16 packet times. Each input port 105 must send 16 packets before the slot (or port) is considered not starved again. When multiple data packets are forwarded from an input port 105 to a respective queue, the accumulator associated with the slot sending the data will count down to a minimum of 0x00000 or 16 packet times. The slot (or port) will only be considered starved if packets are not sent for the next 16 packets times. The maximum and minimum thresholds are 16 packet times, however, the default will be 8 packet times.

Maximum Slot Accumulator:

In one embodiment, the master scheduler 140 includes M "maximum slot accumulators." These accumulators ensure that the system does not burst above the maximum slot bandwidth and overflow the queues 190.

For each max slot accumulator, software program a step value based on a bandwidth allocated for forwarding data o a respective queue 190. Initially, the accumulator is set to a predefined value such as (0x7000). Every 5.39 microseconds, a respective accumulator associated with a queue 190 increments by a predetermined step value. When the accumulator reaches a predefined threshold (0x8000), this means that one packet can be sent to the queue without overflowing it with data. When the packet is sent, the accumulator will be decremented by one packet time (Acc—0x1000). Since the master scheduler 140 can grant permission for all input ports 105 to forward a respective data packet to a given queue, the accumulator can be decremented up to eight packets (Acc—0x8000) if all 8 input ports send a respective data packet to the queue in a same cycle. Note that the accumulator stops decrementing at 0x0000 and stops incrementing at 0xF000. When the max slot accumulator is 0x0000, this means that all eight packets were sent when only one was needed to meet the bandwidth requirements. Before the master scheduler 140 can grant permission to transmit another packet to the respective queue, the accumulator must increment to 0x8000 to account for the extra packets that were sent. When the accumulator is at 0xF000, this means that eight packets need to be sent in order to meet the bandwidth requirements. The master scheduler 140 will keep granting permission for the input ports to forward data packets to the respective queue until the accumulator goes below 0x8000 again.

Scheduling:

There are two levels of scheduling according to an embodiment herein. First, the master scheduler 140 determines on a slot basis who to grant, then based on these grants, the port scheduler 130 determine on a port basis whether to forward data to the queues 190. Breaking up this two-dimensional scheduling algorithm into parts allows this design to easily be implemented in hardware and easily divide among a multi-chip design if required.

Slot Scheduling: The master scheduler 140 determines which slots have not met their "maximum slot bandwidth" and also determines from the input ports 105 which slots are starved and have data to send. For the slots that have met their "maximum slot bandwidth", i.e. the accumulator threshold has been reached, the following grants will be provided:

1.) When one or more of the ports has starved slots, the master scheduler 140 only grants forwarding permission to those slots that are starved. No other slots will be granted permission to forward data from a respective input port 105 to the queues 190.

2.) When there are no ports that have starved slots, the master scheduler 140 only grants forwarding permission to those slots that are not starved at a port level.

3.) If a value of a respective accumulator for the maximum slot accumulator reaches 0xF000 and there are no starved slots, then all slots will be granted permission to forward data to the respective queue. This decreases an amount of unused bandwidth that could occur when the sum of the minimum slot accumulators is less than the total maximum slot accumulator.

Port Scheduling:

When one or more of the input ports 105 receive a grant from the master scheduler 140, the port schedulers 130 (e.g., slave schedulers) individually determine on a port basis which packet to transmit. The input ports 105 make the forwarding decision based on a value of their "minimum port bandwidth" accumulators.

According to one embodiment, there are two levels of priorities in this scheduling. Slots that are starved are considered the highest priority and slots that are not starved are the lowest priority. In one embodiment, the master scheduler 140 services the highest priority scheduling in a round robin manner before servicing the lowest priority in a round robin manner.

Once all packets have been sent for that given time period, the master scheduler 140 receives an update from the slave port schedulers 130 indicating which queues 190 the respective input ports 105 send a data packet. Since the master scheduler 140 could have granted permission for all input ports 105 to forward data when the accumulator reaches its threshold (e.g., max empty value), all input ports 105 can send a data packet to the same queue 190. When the master scheduler 140 receives the feedback that that all eight packets (or fewer than eight as the case may be) were sent to the same slot 710, the master scheduler 140 modifies the respective max slot accumulator accordingly. Since, in the present embodiment, each the queues 190 (e.g., backplane FIFOs) can store up to 21 packets for forwarding to the backplane, the queues 190 have as enough room to absorb any extra packets.

During the port scheduling process, a slot has highest priority over the port itself. Under some conditions an un-starved port with a starved slot can be granted over a starved port with an un-starved slot. This has a minimum affect on system performance because the condition is temporary and will be corrected on the next system grant. Once all the starved slots have been granted "data forwarding" permission, the starved ports will get serviced.

Master/Slave Messaging Implementation

After every 5.39 microseconds (e.g., on each new permission granting cycle), a scheduling decision needs to be made. According to one embodiment, the master scheduler 140 communicates with the port schedulers 130 whether they are permitted to forward data to any of the queues 190. In one embodiment, the process is as follows:

First, via use of respective port status information 120, the port schedulers 130 notify the master scheduler 140 whether they have been starved of forwarding data packets to any of the queues 190. In other words, the port schedulers 130 notify the master scheduler 140 of their respective minimum slot accumulator values.

Thereafter, based on which of the input ports 105 has been starved and an emptiness associated with the queues 190, the master scheduler 140 grants permission to none, one, or more of the input ports 105 to forward data to a respective queue.

Each port scheduler 130 receives the grant information from the master scheduler 140. Based on a permission grant, the port schedulers 130 determine whether they have something to send to a respective queue and a value associated with the respective minimum port accumulators, the respective port scheduler 130 slave makes a decision on which slot to send to. Each of the port schedulers 130 provide feedback to the master scheduler 140 to which queue 190 they sent a respective data packet.

Figure 4:
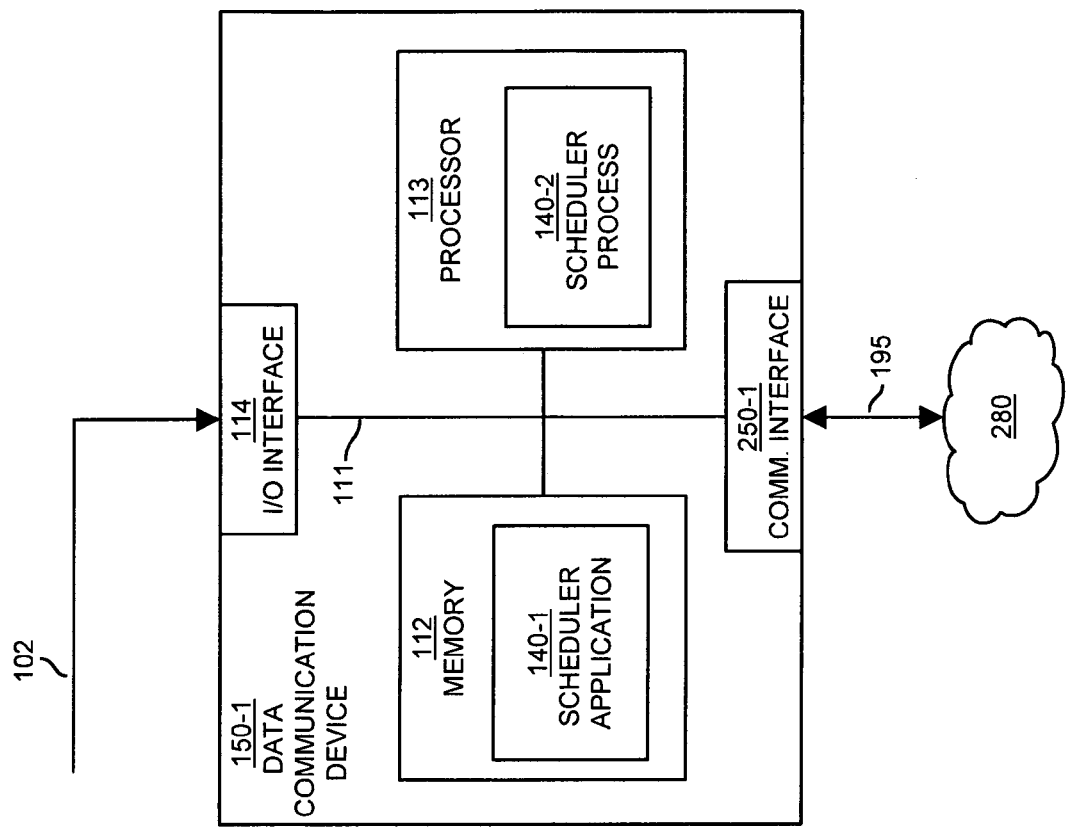
FIG. 4 is a block diagram of sample hardware and software for executing scheduling techniques according to an embodiment herein.

As discussed above, FIGS. 1-3 describe the functionality associated with data communication system data communication system 200 according to an embodiment herein. FIG. 4 is a specific example of a sample architecture for implementing a data communication device 150 according to an embodiment herein. As shown, data communication device 150-1 includes a processor 113 and corresponding software code (e.g., scheduler application 140-1) to carry out the embodiments discussed in this specification. As an alternative to an embodiment as shown in FIG. 4, the data communication devices 150 and corresponding data communication system 200 can be implemented via hardware components such as logic gates, buffers, etc.

As shown in FIG. 4, data communication device 150-1 of the present example includes an interconnect 111 that couples a memory system 112, a processor 113, an input/output interface 114, and a communications interface 250-1. Input/output interface 114 enables data communication device 150-1 to receive data on input channels 102. Communications interface 250-1 enables data communication device 150-1 to output data from queues 190 over output channels 195 to other data communication devices 150 over mesh 280 (e.g., a backplane).

As shown, memory system 112 is encoded with a scheduler application 140-1 supporting the functionality of scheduling flows of data from input ports 105 to queues 190. Scheduler application 140-1 may be embodied as software code such as data and/or logic instructions (e.g., code stored in the memory or on another computer readable medium such as a disk) that support processing functionality according to different embodiments described herein. During operation, processor 113 accesses memory system 112 via the interconnect 111 in order to launch, run, execute, interpret or otherwise perform the logic instructions of the resource manager application 120-1. Execution of scheduler application 140-1 produces processing functionality in scheduler process 140-2. In other words, the scheduler process 140-2 represents one or more portions of the master scheduler 140 (or the entire application 140-1) performing within or upon the processor 113 in the data communication device 150-1.

It should be noted that the master scheduler 140 executed in data communication device 150-1 is represented in FIG. 4 by either one or both of the scheduler application 140-1 and/or the scheduler process 140-2. For purposes of this discussion, general reference will be made to the master scheduler 140 as performing or supporting the various steps and functional operations to carry out techniques discussed herein.

It should also be noted that example configurations herein include the scheduler application 140-1 itself (i.e., the unexecuted or non-performing logic instructions and/or data). The scheduler application 140-1 may be stored on a computer readable medium (such as a floppy disk), hard disk, or optical medium. The scheduler application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of scheduler application 140-1 in processor 113 as the scheduler process 140-2. Thus, those skilled in the art will understand that the data communication device may include other processes and/or software and hardware components to carry out functionality described herein.

Figure 5:
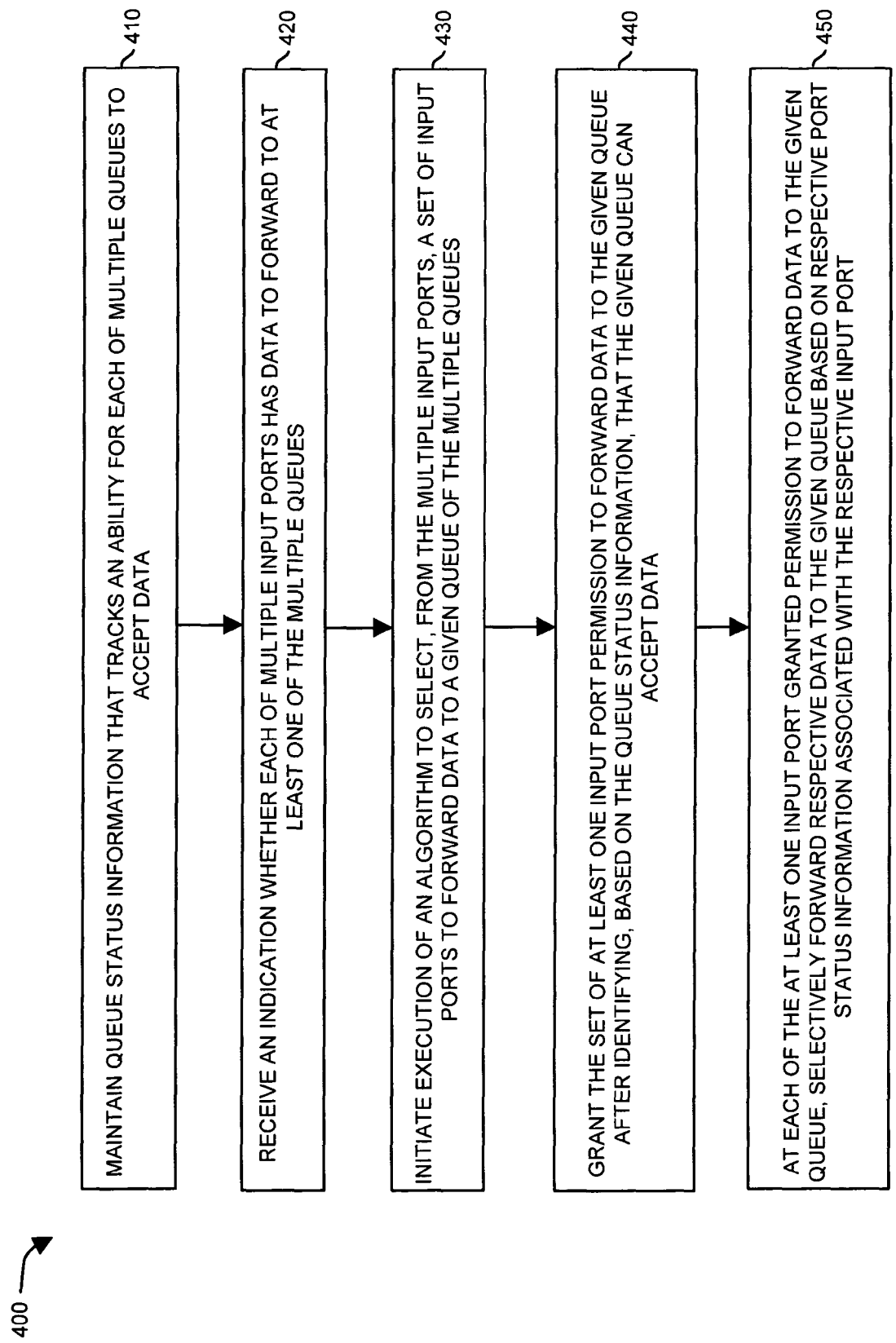
FIG. 5 is a flowchart illustrating a technique of scheduling traffic flows according to an embodiment herein.

FIG. 5 is a flowchart 400 illustrating a technique of scheduling data packets according to an embodiment herein. FIG. 5 will be described with respect to the embodiments as discussed with respect to FIGS. 1-4. As mentioned, a respective data communication device 150 can be implemented in hardware or software. Note that the following discussion includes concepts and techniques discussed above.

In step 410, the master scheduler 140 maintains queue status information 135 that tracks an ability for each of multiple queues 190 to accept new data without overflowing.

In step 420, the master scheduler 140 receives an indication whether each of multiple input ports 105 has data to forward to at least one of the multiple queues 190.

In step 430, the master scheduler 140 initiates execution of an algorithm to select, from the multiple input ports 105, a set of input ports 105 to forward data to a given queue of the multiple queues 190. In other words, the master scheduler 140 checks to see if any of the input ports 105 have been starved of sending data packets to any of the queues 190 and/or if any of the input ports 105 has any data to forward to the queues 190.

In step 440, the master scheduler 140 grants the set of at least one input port 105 permission to forward data to the given queue (e.g., queue 190-1) after identifying, based on the queue status information 135, that the given queue 190-1 can accept data.

In step 450, each of the input ports 105 that have been granted permission (in a corresponding permission granting cycle) to forward data to the given queue makes a further determination whether to actually forward data to the given queue. In one embodiment, as previously discussed above, a respective input port 105 selectively forwards data to the given queue based on respective port status information 120 associated with the respective input port.

Figure 6:
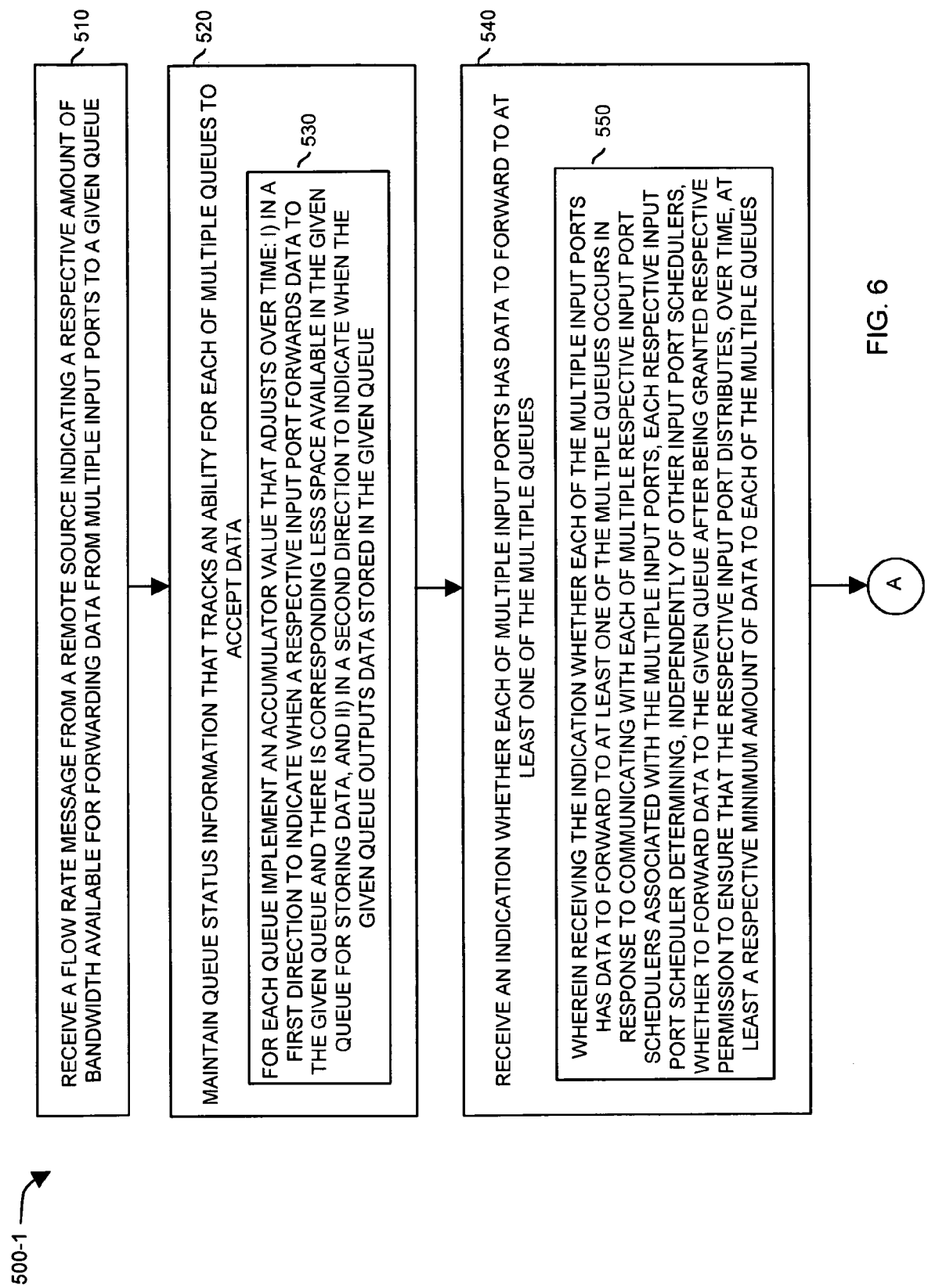
FIGS. 6 and 7 combine to form a flowchart illustrating more specific techniques of scheduling data flows according to an embodiment herein.
Figure 7:
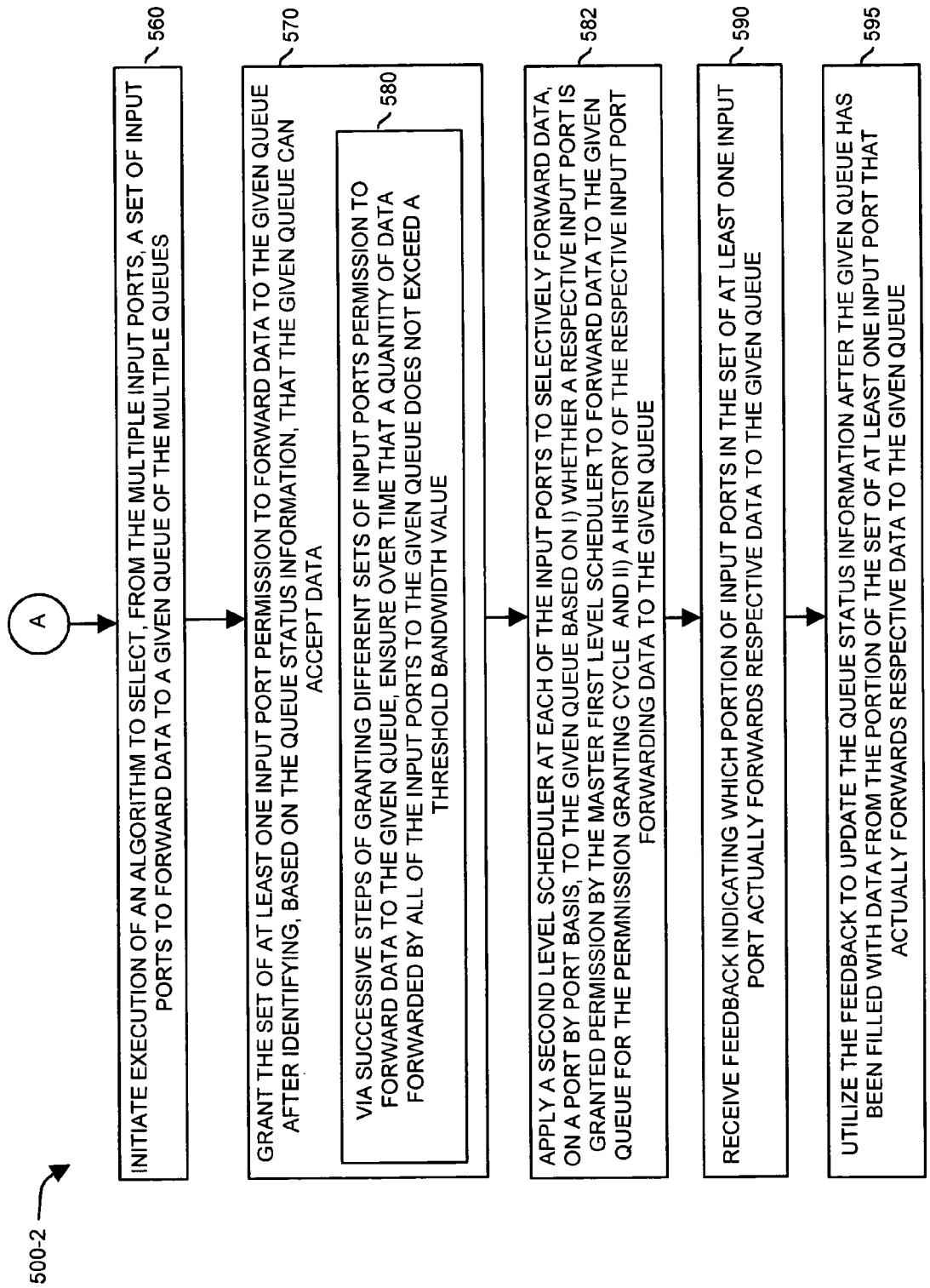

FIGS. 6 and 7 combine to form a flowchart 500 (e.g., flowchart 500-1 and flowchart 500-2) illustrating certain techniques of scheduling data packet transmissions according to an embodiment herein.

In step 510 of FIG. 6, the master scheduler 140 receives a flow rate message from a remote source (e.g., process 134 associated with data communication device 150-1) indicating a respective amount and/or change in an amount of bandwidth available for forwarding data from the multiple input ports 105 to a given one of queues 190. Assume that the given queue in this example is queue 190-1.

In step 520, the master scheduler 140 maintains queue status information 135 that tracks an ability for each of multiple queues 190 to accept data.

In sub-step 530, for each queue 190, the master scheduler 190 implements an accumulator value that adjusts over time: i) in a first direction to indicate when a respective input port 105 forwards data to the given queue 190-1 and there is corresponding less space available in the given queue 190-1 for storing data, and ii) in a second direction to indicate when the given queue 190-1 outputs data stored in the given queue 190-1 through output channels 195.

In step 540, the master scheduler 140 receives an indication whether each of multiple input ports 105 has data to forward to at least one of the multiple queues 190.

In sub-step 550, the master scheduler 140 receives an indication whether each of the multiple input ports 105 has data to forward to at least one of the multiple queues 190 in response to communicating with each of the multiple respective port schedulers 130 associated with the multiple input ports 105. Each respective port scheduler 130 determines, independently of other input port schedulers 130, whether to forward data to the given queue 190-1 after being granted respective permission to ensure that the respective input port 105 distributes, over time, at least a respective minimum amount of data to each of the multiple queues 190.

In step 560 of FIG. 7, the master scheduler 140 initiates execution of an algorithm to select, from the multiple input ports 105, a set of input ports to forward data to a given queue 190-1 of the multiple queues 190.

In step 570, the master scheduler 140 grants the set of input ports permission to forward data to the given queue 190-1 after identifying, based on the queue status information 135, that the given queue 190-1 can accept data.

In step 580, via successive steps of granting different sets of one or more input ports 105 permission to forward data to the given queue 190-1, the master scheduler 140 ensures (over time) that a quantity of data forwarded by all of the input ports 105 to the given queue 190-1 does not exceed a threshold bandwidth value.

In step 582, a respective second level scheduler (e.g., a respective one of port schedulers 130) associated with a corresponding input port selectively forwards data to the given queue 190-1 based on i) whether a respective input port is granted permission by the master scheduler 140 to forward data to the given queue for the permission granting cycle, and ii) a history of the respective input port forwarding data to the given queue 190-1 during previous permission granting cycles. As discussed in further detail above, the second level schedulers ensure that each of slots 710 is able to forward data over respective link 132 at a respective minimum rate.

In step 590, the master scheduler 140 receives feedback indicating which portion of input ports 105 in the set of at least one input port actually forwards respective data to the given queue 190-1.

In step 595, the master scheduler 140 utilizes the feedback to update the queue status information 135 after the given queue 190-1 has been filled with data from the portion of the set of at least one input port that actually forwards respective data to the given queue 190-1.

As discussed, techniques herein are well suited for use in applications such as a transmission of data through a backplane. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for managing data traffic through a data communication system, the method comprising steps of:
maintaining queue status information that tracks an ability for each of multiple queues to accept data;
receiving an indication whether each of multiple input ports has data to forward to at least one of the multiple queues;
initiating execution of an algorithm to select, from the multiple input ports, a plurality of input ports to forward data to a given queue of the multiple queues;
granting the plurality of input ports permission to forward data to the given queue after identifying, based on the queue status information, that the given queue can accept data;
receiving feedback indicating which portion of input ports in the plurality of input ports actually forwards respective data to the given queue; and
utilizing the feedback to update the queue status information after the given queue has been filled with data from the portion of the plurality of input ports that actually forwards respective data to the given queue.

2. A method as in claim 1, wherein maintaining the queue status information includes implementing an accumulator value that adjusts over time: i) in a first direction to indicate when a respective input port forwards data to the given queue and there is corresponding less space available in the given queue for storing data, and ii) in a second direction to indicate when the given queue outputs data stored in the given queue.

3. A method as in claim 1, wherein utilizing the feedback and maintaining the queue status information includes adjusting a value associated with a first queue of the multiple queues to reflect: i) a change in the respective fullness associated with the first queue based on the first input port forwarding respective data to the given queue, and ii) a change in the respective fullness associated with the given queue as a result of the first queue outputting corresponding data to a respective destination.

4. A method as in claim 1, during a process of repeating steps of receiving, initiating, and granting:
at least occasionally granting permission to each of the multiple input ports to forward corresponding data to each of the multiple queues to ensure that each of the multiple input ports is able to forward at least a minimum respective amount of data to each of the multiple queues over time.

5. A method as in claim 1, wherein receiving the indication whether each of the multiple input ports has data to forward to at least one of the multiple queues occurs in response to communicating with each of multiple respective input port schedulers associated with the multiple input ports, each respective input port scheduler determining, independently of other input port schedulers, whether to forward data to the given queue after being granted respective permission to ensure that the respective input port distributes, over time, at least a respective minimum amount of data to each of the multiple queues.

6. A method as in claim 1 further comprising:
receiving a flow rate message from a remote source indicating a respective amount of bandwidth available for forwarding data from the multiple input ports to the given queue; and
wherein maintaining the queue status information includes taking into account the respective amount of bandwidth available for forwarding data to the given queue when determining whether the given queue can be filled with data.

7. A method as in claim 1, wherein granting the plurality of input ports permission to forward data packets to a respective one of the multiple queues enables at least one of variable bit rate data streams and unspecified bit rate data streams received at the multiple input ports to be forwarded to the multiple queues without dropping respective data packets received in the at least one of variable bit rate data streams and unspecified bit rate data streams, even though the multiple queues output respective stored data at a constant rate.

8. A method as in claim 7 further comprising:
via successive steps of granting different pluralities of input ports permission to forward data to the given queue, ensuring over time that a quantity of data forwarded by all of the input ports to the given queue does not exceed a threshold bandwidth value.

9. A method as in claim 1, wherein granting the plurality of input ports permission to forward data to the given queue includes granting the plurality of input ports permission to forward respective data to the given queue after identifying, based on the queue status information, that the given queue can store a single, common sized data packet from each respective input port in the plurality.

10. A method as in claim 1 further comprising:
identifying that a group of input ports having respective data packets to forward to the given queue, if granted permission to simultaneously forward the respective data packets to the given queue, would overflow the given queue with data; and
initiating execution of a round robin process in the algorithm that grants permission to forward data to each member in the over a course of successive permission granting cycles to enable each member in the group of the multiple queues to forward respective data at a minimum rate to the given queue.

11. A method as in claim 1 further comprising:
identifying that a group of input ports having respective data packets to forward to the given queue, if granted permission to simultaneously forward the respective data packets to the given queue, would overflow the given queue with data; and
declining a grant of permission for the group of input ports to forward the respective data packets to the given queue for at least one successive permission granting cycles until the given queue outputs enough stored data such that there is enough room in the given queue to store the respective data packets from each member of the group of input ports without overflowing the given queue.

12. A method as in claim 1, wherein granting the plurality of input ports permission to forward data packets to the given queue includes granting, in a respective permission granting cycle, a first input port permission to forward a respective first data packet to a first queue, the method further comprising:
in the respective permission granting cycle, granting permission to the first input port to forward a respective second data packet to a second queue; and
receiving, from a scheduler associated with the first input port, feedback from the first input port indicating whether the scheduler chose to forward the first data packet to the first queue or forward the second data packet to the second queue.

13. A data communication device comprising:
multiple input ports;

multiple queues; and a first level scheduler of a scheduler system that supports operations of:
- maintaining queue status information that tracks an ability for each of the multiple queues to accept data;
- receiving an indication whether each of the multiple input ports has data to forward to at least one of the multiple queues;
- initiating execution of an algorithm to select, from the multiple input ports, a plurality of input ports to forward data to a given queue of the multiple queues;
- granting the plurality of input ports permission to forward data to the given queue after identifying, based on the queue status information, that the given queue can accept data;
- receiving feedback indicating which portion of input ports in the plurality of input ports actually forwards respective data to the given queue; and
- utilizing the feedback to update the queue status information after the given queue has been filled with data from the portion of the plurality of input ports that actually forwards respective data to the given queue.

14. A data communication device as in claim 13, wherein utilizing the feedback and maintaining the queue status information includes adjusting a value associated with a first queue of the multiple queues to reflect: i) a change in the respective fullness associated with the first queue based on the first input port forwarding respective data to the given queue, and ii) a change in the respective fullness associated with the given queue as a result of the first queue outputting corresponding data to a respective destination.

15. A data communication device as in claim 13, wherein receiving the indication whether each of the multiple input ports has data to forward to at least one of the multiple queues occurs in response to communicating with each of multiple respective input port schedulers associated with the multiple input ports, each respective input port scheduler determining, independently of other input port schedulers, whether to forward data to the given queue after being granted respective permission to ensure that the respective input port distributes, over time, at least a respective minimum amount of data to each of the multiple queues.

16. A data communication device as in claim 13, wherein the scheduler further supports operations of:
- identifying that a group of input ports having respective data packets to forward to the given queue, if granted permission to simultaneously forward the respective data packets to the given queue, would overflow the given queue with data; and
- initiating execution of a round robin process in the algorithm that grants permission to forward data to each member in the over a course of successive permission granting cycles to enable each member in the group of the multiple queues to forward respective data at a minimum rate to the given queue.

17. A data communication device as in claim 13, wherein granting the plurality of input ports permission to forward data packets to the given queue includes granting, in a respective permission granting cycle, a first input port permission to forward a respective first data packet to a first queue, the scheduler further supporting operations of:
- in the respective permission granting cycle, granting permission to the first input port to forward a respective second data packet to a second queue; and
- receiving, from a scheduler associated with the first input port, feedback from the first input port indicating whether the scheduler chose to forward the first data packet to the first queue or forward the second data packet to the second queue.

18. A data communication device as in claim 13, wherein the scheduler system includes a respective second level scheduler associated with each input port, each of the respective second level schedulers selectively forwarding data received on a respective input port depending on i) whether the first level scheduler grants the respective second level scheduler permission to forward data to at least one of the multiple queues, and ii) a history of the respective input port forwarding received data to each of the multiple queues.

19. A data communication device as in claim 18, wherein the first level scheduler maintains queue status information indicating whether the multiple queues can accept new data for a given permission granting cycle in which the first level scheduler selectively grants at least one of the multiple input ports permission to forward data to one of the multiple queues.

20. A data communication device as in claim 19, wherein the first level scheduler selectively grants forwarding permission to the second level schedulers such that no single one of the multiple queues is filled with data from a combination of all input ports faster than a maximum respective rate.

21. A data communication device as in claim 18, wherein the first level scheduler grants the respective input port permission to forward received data to at least two of the multiple queues during a respective permission granting cycle, the second level scheduler choosing one of the at least two queues to forward data during the permission granting cycle.

22. A data communication device as in claim 21, wherein the permission received by the second level scheduler during the respective permission granting cycle enables the second level scheduler to forward received data only during the respective permission granting cycle.

23. A non-transitory computer-readable storage medium encoded with stored instructions which, when executed by a processor, perform a method for data communication comprising:
- maintaining queue status information that tracks an ability for each of multiple queues to accept data;
- receiving an indication whether each of multiple input ports has data to forward to at least one of the multiple queues;
- initiating execution of an algorithm to select, from the multiple input ports, a plurality of input ports to forward data to a given queue of the multiple queues;
- granting the plurality of input ports permission to forward data to the given queue after identifying, based on the queue status information, that the given queue can accept data;
- receiving feedback indicating which portion of input ports in the plurality of input ports actually forwards respective data to the given queue; and
- utilizing the feedback to update the queue status information after the given queue has been filled with data from the portion of the plurality of input ports that actually forwards respective data to the given queue.

24. A two level scheduler system that regulates a flow of forwarding data received on multiple input ports to multiple output queues, the two level scheduler comprising:
- a first level scheduler process that selectively grants permission to each of the multiple input ports to forward received data to the multiple output queues, receives feedback indicating which portion of input ports in the multiple input ports actually forwards respective data to a given queue, and utilizes the feedback to update queue status information after the given queue has been filled with data from the portion of the multiple input ports that actually forwards respective data to the given queue; and each of the multiple input ports including a respective second level scheduler process that selectively forwards data received on a respective input port depending on i) whether the first level scheduler grants the respective second level scheduler permission to forward data to at least one of the multiple queues, and ii) a history of the respective input port forwarding received data to each of the multiple queues.

25. A two level scheduler system as in claim 24, wherein the first level scheduler maintains the queue status information indicating whether the multiple queues can accept new data for a given permission granting cycle in which the first level scheduler selectively grants at least one of the input ports permission to forward data to one of the multiple queues.

26. A two level scheduler system as in claim 25, wherein the first level scheduler grants the respective input port permission to forward received data to at least two of the multiple queues during a respective permission granting cycle, the second level scheduler choosing one of the at least two queues to forward data during the permission granting cycle.

27. A two level scheduler system as in claim 26, wherein the permission received by the second level scheduler during the respective permission granting cycle enables the second level scheduler to forward received data only during the respective permission granting cycle and not future permission granting cycles.

28. A two level scheduler system as in claim 24, wherein the first level scheduler selectively grants forwarding permission to the second level schedulers such that no single one of the multiple output queues is filled with data from a combination of all input ports faster than a maximum respective rate.

29. A two level scheduler system as in claim 28, wherein each of the second level schedulers associated with the multiple input ports selectively forwards received data to each of the multiple output queues at a respective minimum rate.

30. A two level scheduler system as in claim 29, wherein each of the second level schedulers associated with the multiple input ports selectively forwards received data to each of the multiple output queues such that a corresponding input port does not forward data to any one of the multiple queues faster than a maximum respective rate over time.

31. A two level scheduler system as in claim 30, wherein each of the second level schedulers manages flows of data associated with multiple input streams of data received on a respective input channel.

* * * * *